(12) United States Patent
Etemad-Moghadam et al.

(10) Patent No.: US 8,124,888 B2
(45) Date of Patent: Feb. 28, 2012

(54) CONCEALED AND FLUSH DUAL PHONE AND POWER OUTLET

(75) Inventors: Cyrus Etemad-Moghadam, Fallston, MD (US); Majid Jelveh, Baltimore, MD (US); Anthony Dean Haines, Hampstead, MD (US)

(73) Assignee: Wire Wrangler, LLC, Baltimore, MD (US)

( * ) Notice: Subject to any disclaimer, the term of this patent is extended or adjusted under 35 U.S.C. 154(b) by 449 days.

(21) Appl. No.: 12/480,040

(22) Filed: Jun. 8, 2009

(65) Prior Publication Data

US 2009/0321104 A1    Dec. 31, 2009

Related U.S. Application Data

(60) Provisional application No. 61/075,414, filed on Jun. 25, 2008.

(51) Int. Cl.
*H02G 3/08* (2006.01)
*H01H 13/04* (2006.01)

(52) U.S. Cl. ............... 174/481; 174/55; 174/50; 174/53; 220/3.2; 220/3.3; 379/437

(58) Field of Classification Search .................. 174/480, 174/481, 50, 53, 57, 58, 55; 220/3.2–3.9, 220/4.02; 248/906; 439/535, 536, 135, 136, 439/139, 140; 379/428.01, 428.02, 428.03, 379/428.04, 437, 438, 435, 440
See application file for complete search history.

(56) References Cited

U.S. PATENT DOCUMENTS

| | | | | |
|---|---|---|---|---|
| 4,947,281 A * | 8/1990 | Boteler | ........................... | 174/53 |
| 5,574,256 A * | 11/1996 | Cottone | ........................... | 174/53 |
| 5,621,788 A * | 4/1997 | Eiken | ........................... | 379/435 |
| 5,865,633 A * | 2/1999 | Hou | ........................... | 439/139 |
| 6,207,895 B1 * | 3/2001 | Engel | ........................... | 174/53 |
| 6,364,673 B1 * | 4/2002 | Lee | ........................... | 439/139 |
| 6,750,398 B1 * | 6/2004 | Richardson | ........................... | 174/58 |
| 7,141,736 B2 * | 11/2006 | Plankell | ........................... | 174/50 |
| 7,695,293 B1 * | 4/2010 | Sikes | ........................... | 439/139 |

* cited by examiner

*Primary Examiner* — Angel R Estrada
(74) *Attorney, Agent, or Firm* — Rahman LLC

(57) ABSTRACT

A system to enclose communication wiring of electronic devices includes a box; a power cover plate; a cover frame; a cover plate; and a low voltage connector plate attached to the power cover plate, wherein the power cover plate, the cover frame, and the cover plate attach to the box, wherein the low voltage connector plate and the power cover plate are substantially aligned in a line, wherein the cover frame and the cover plate are substantially aligned, and wherein the box simultaneously houses telephone electrical connection components, power electrical connection components, and data electrical connection components. The cover plate may be substantially flush with a wall upon installation. The box may comprise an enclosed section connectively hinged to the box. The system is preferably made of metal, plastic, or combination thereof.

20 Claims, 12 Drawing Sheets

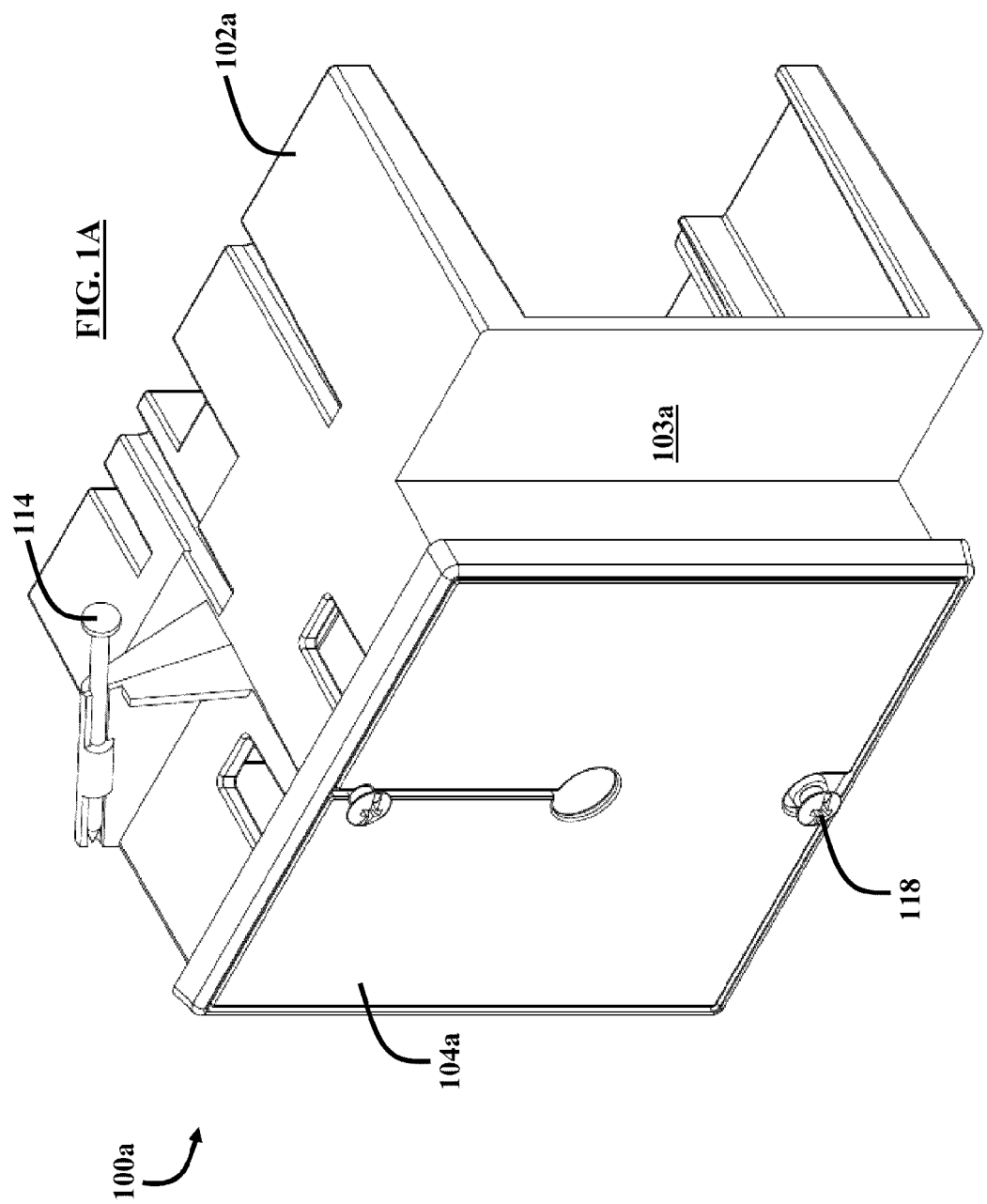

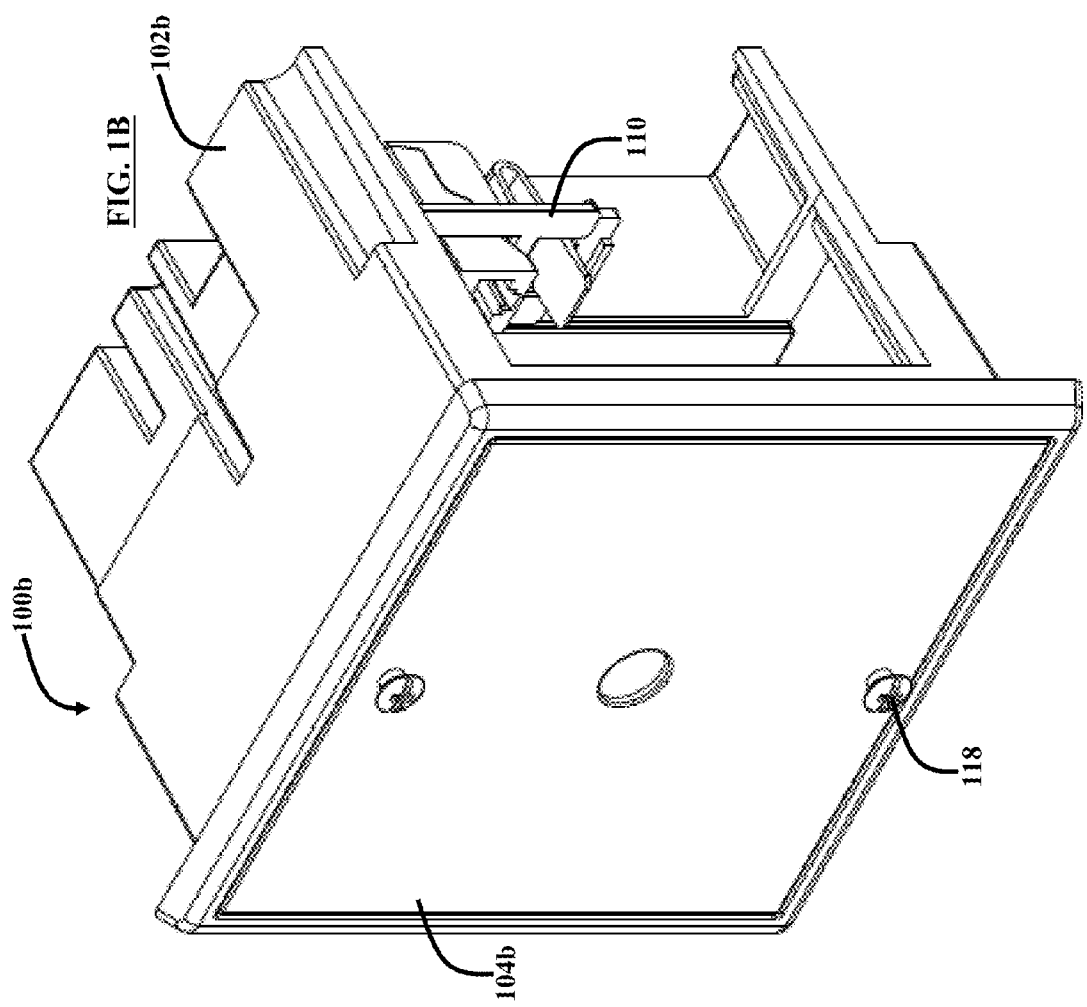

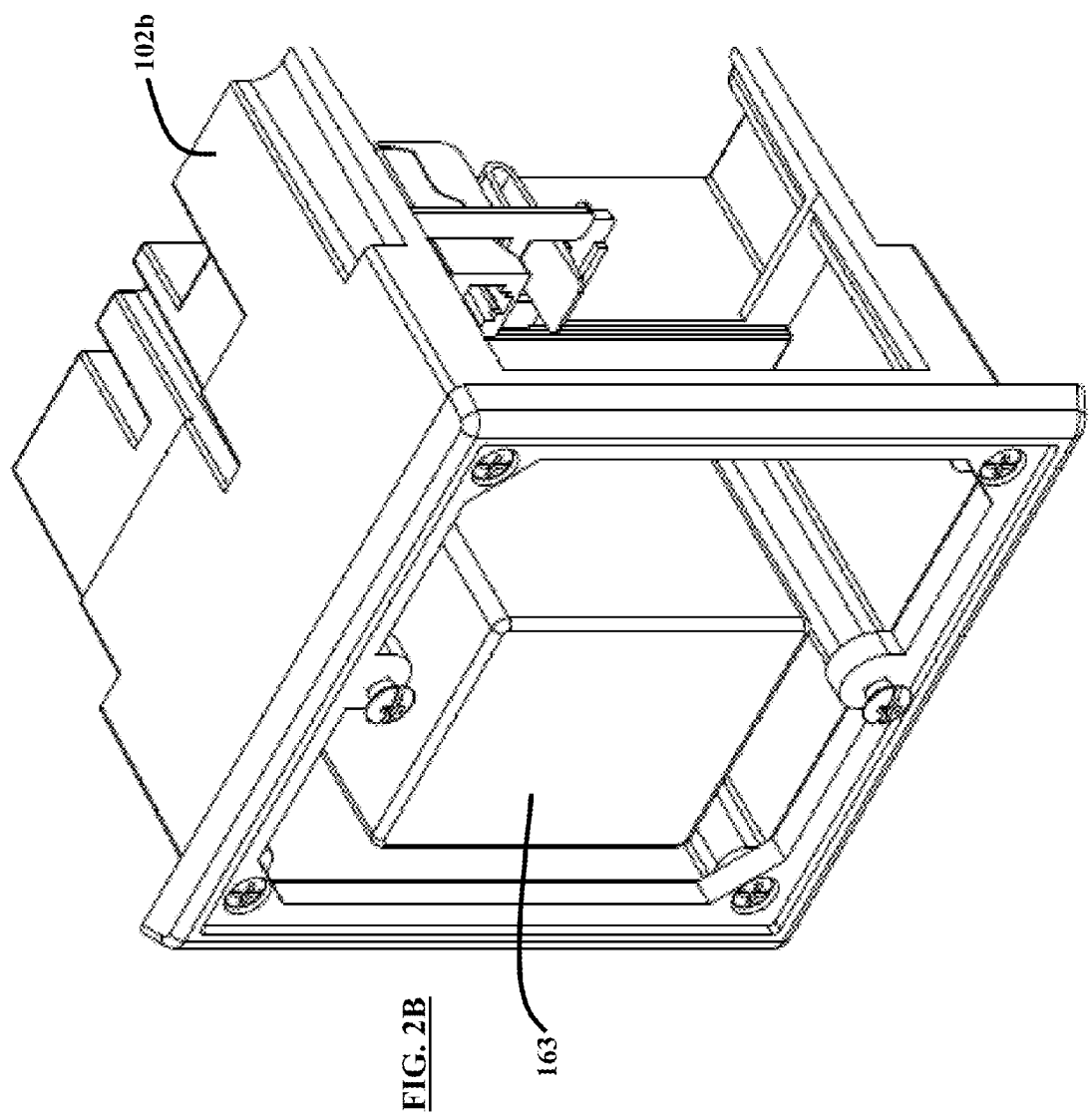

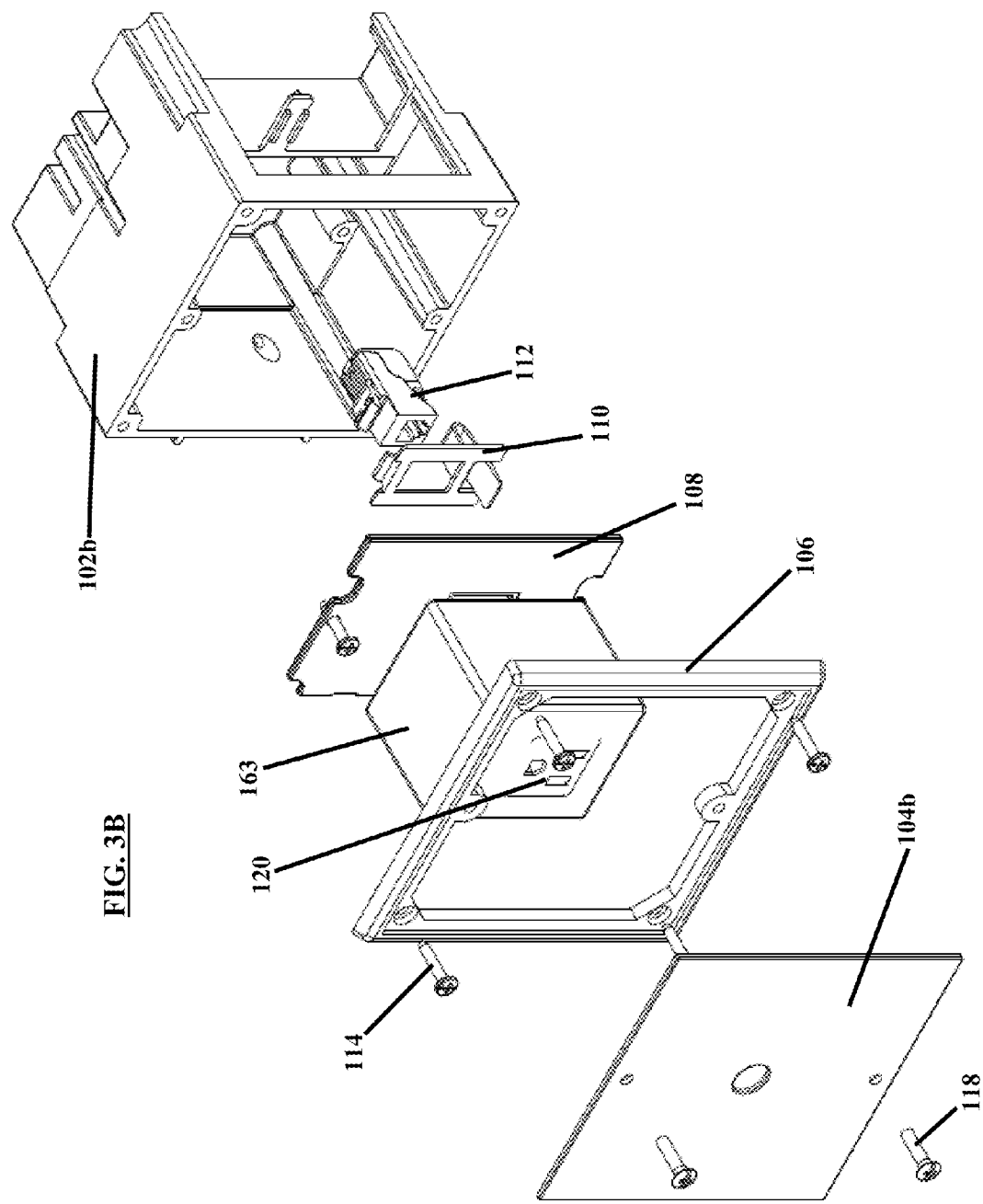

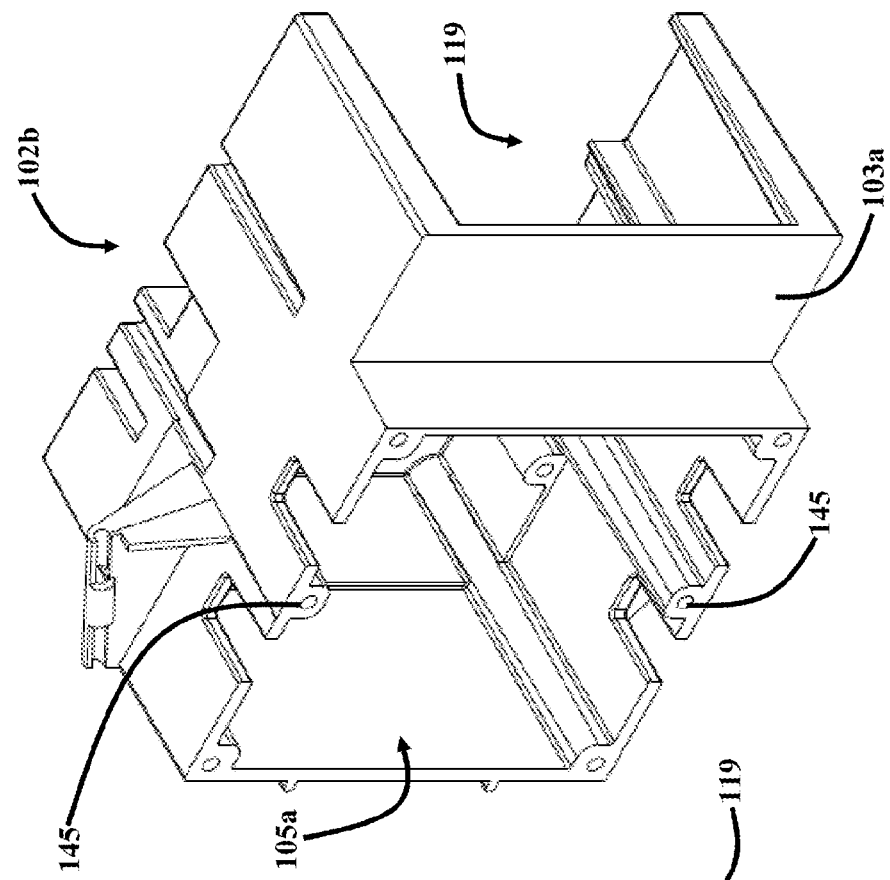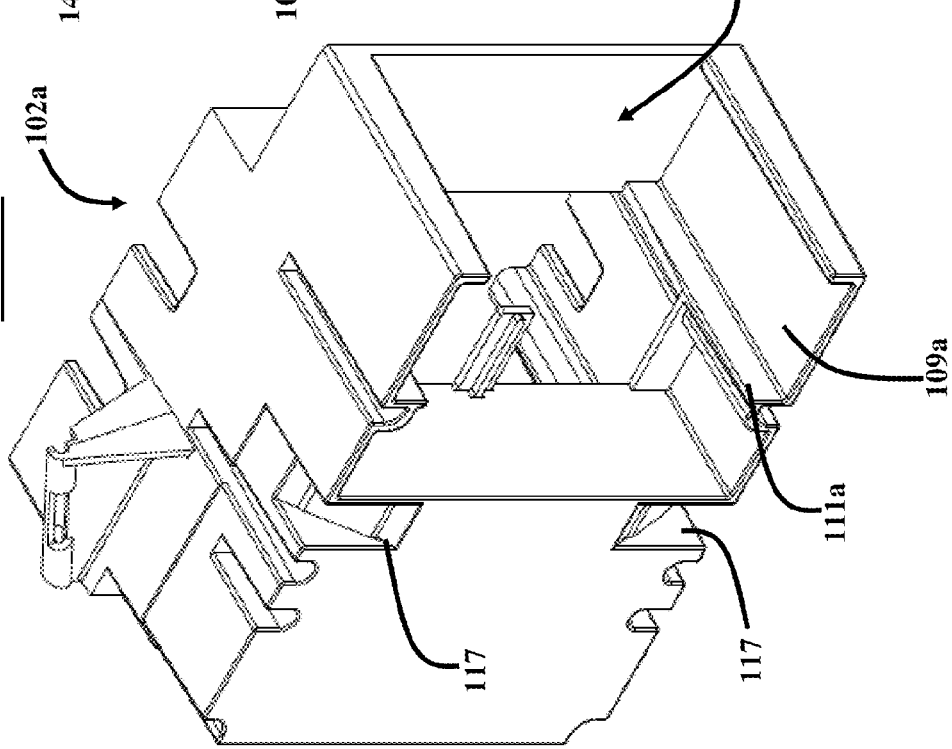

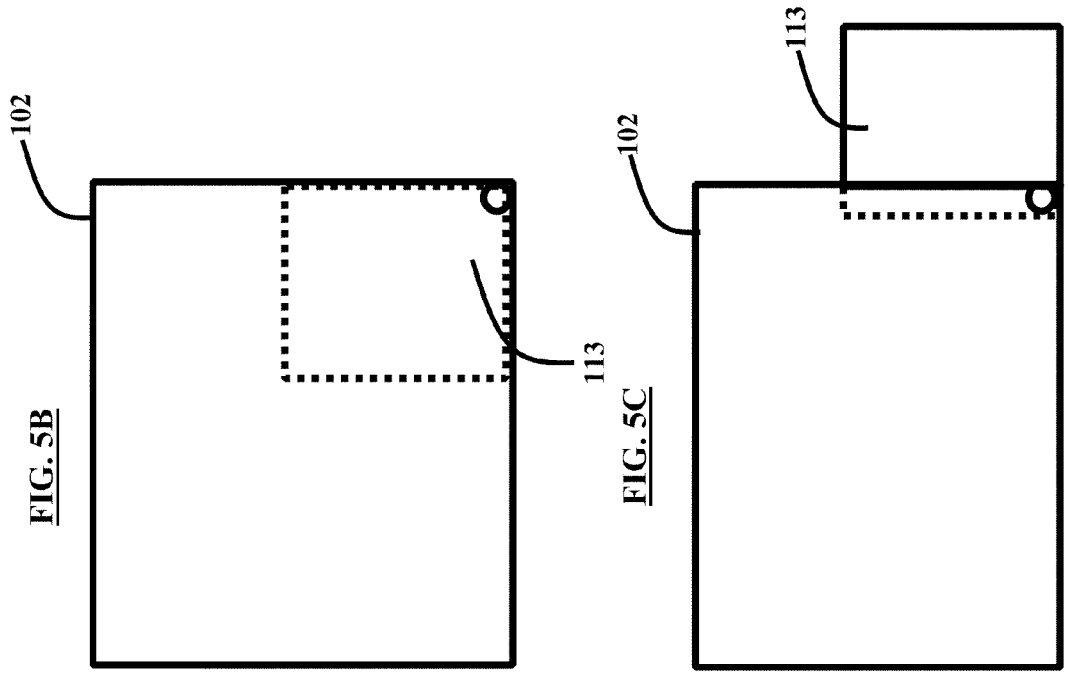
FIG. 5B
FIG. 5C
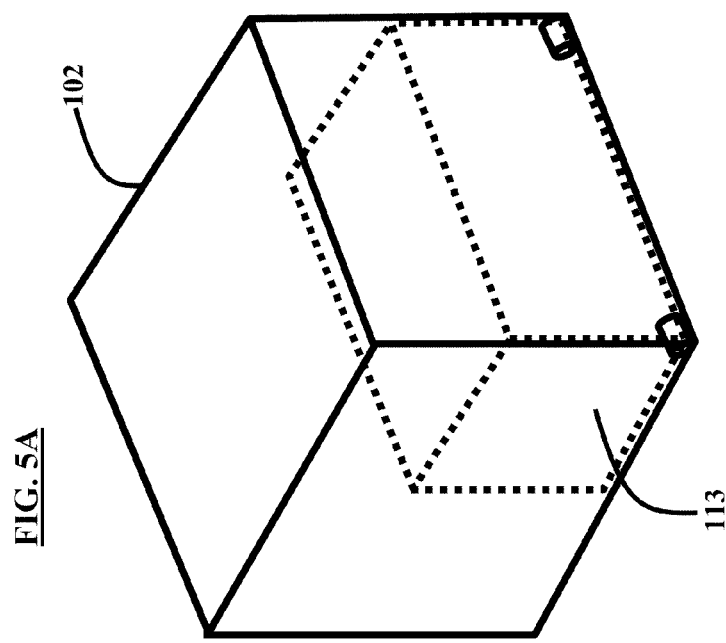
FIG. 5A

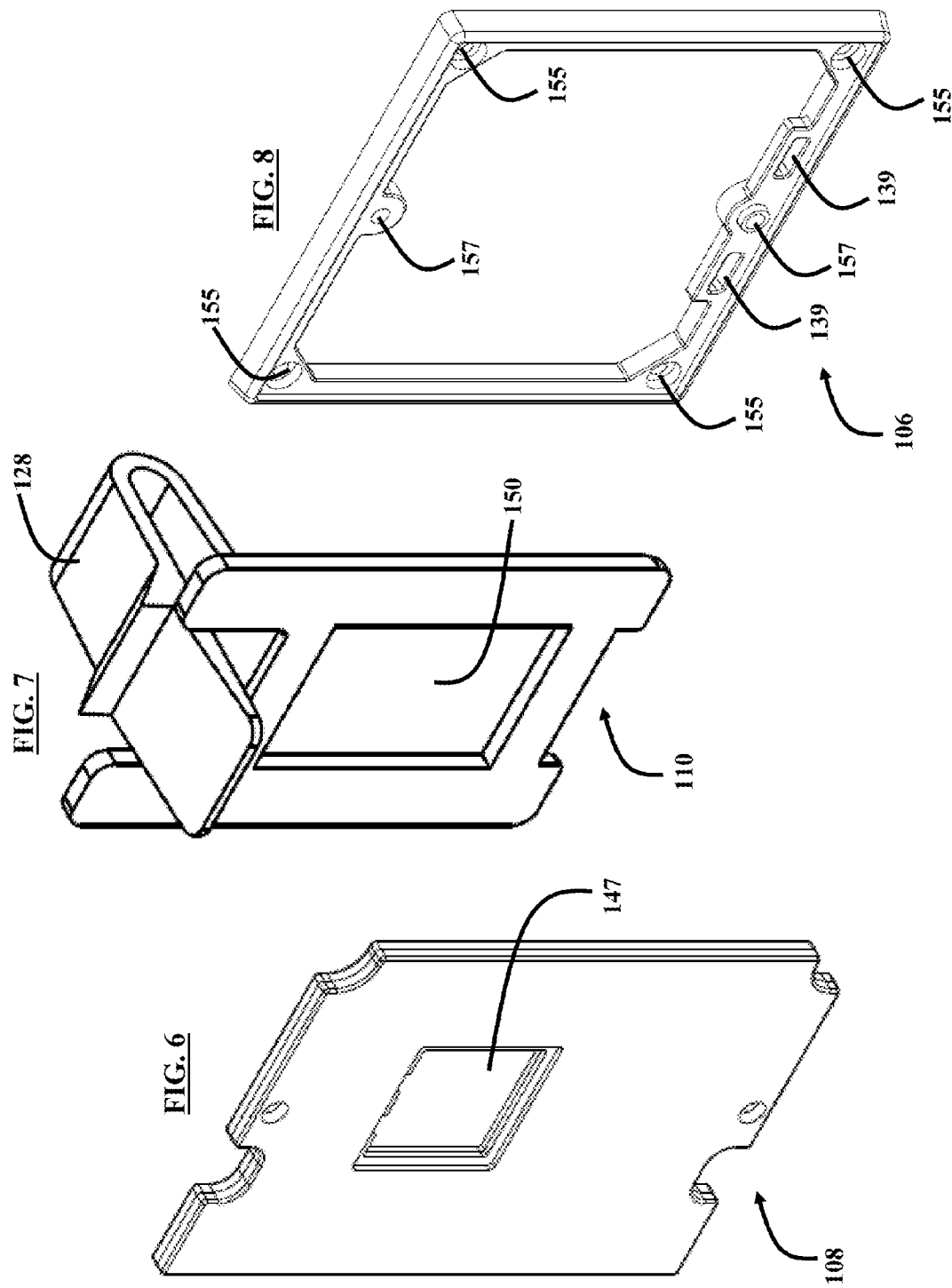

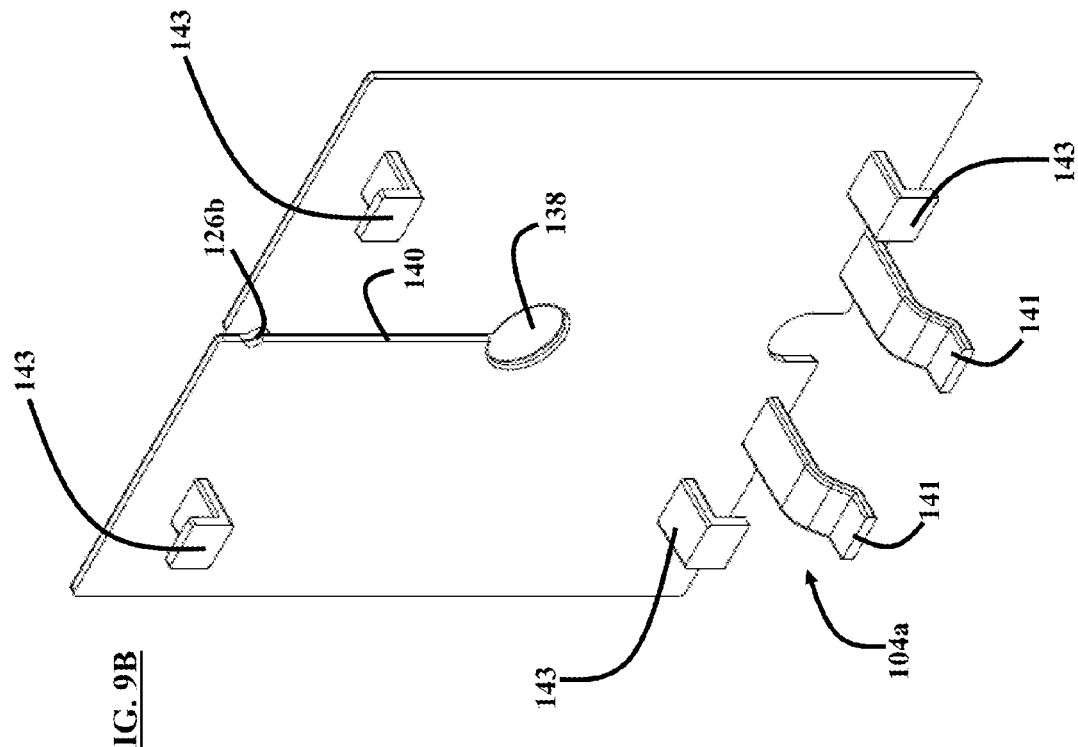
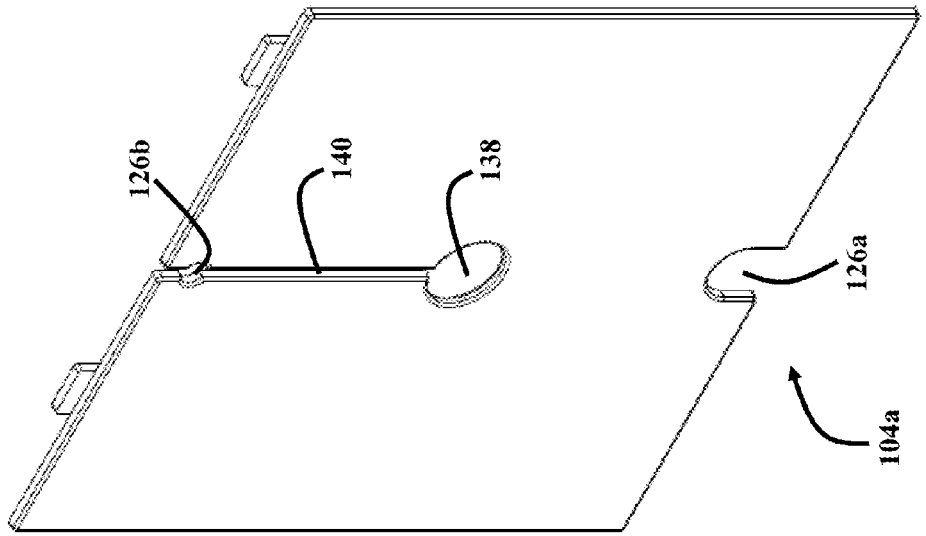

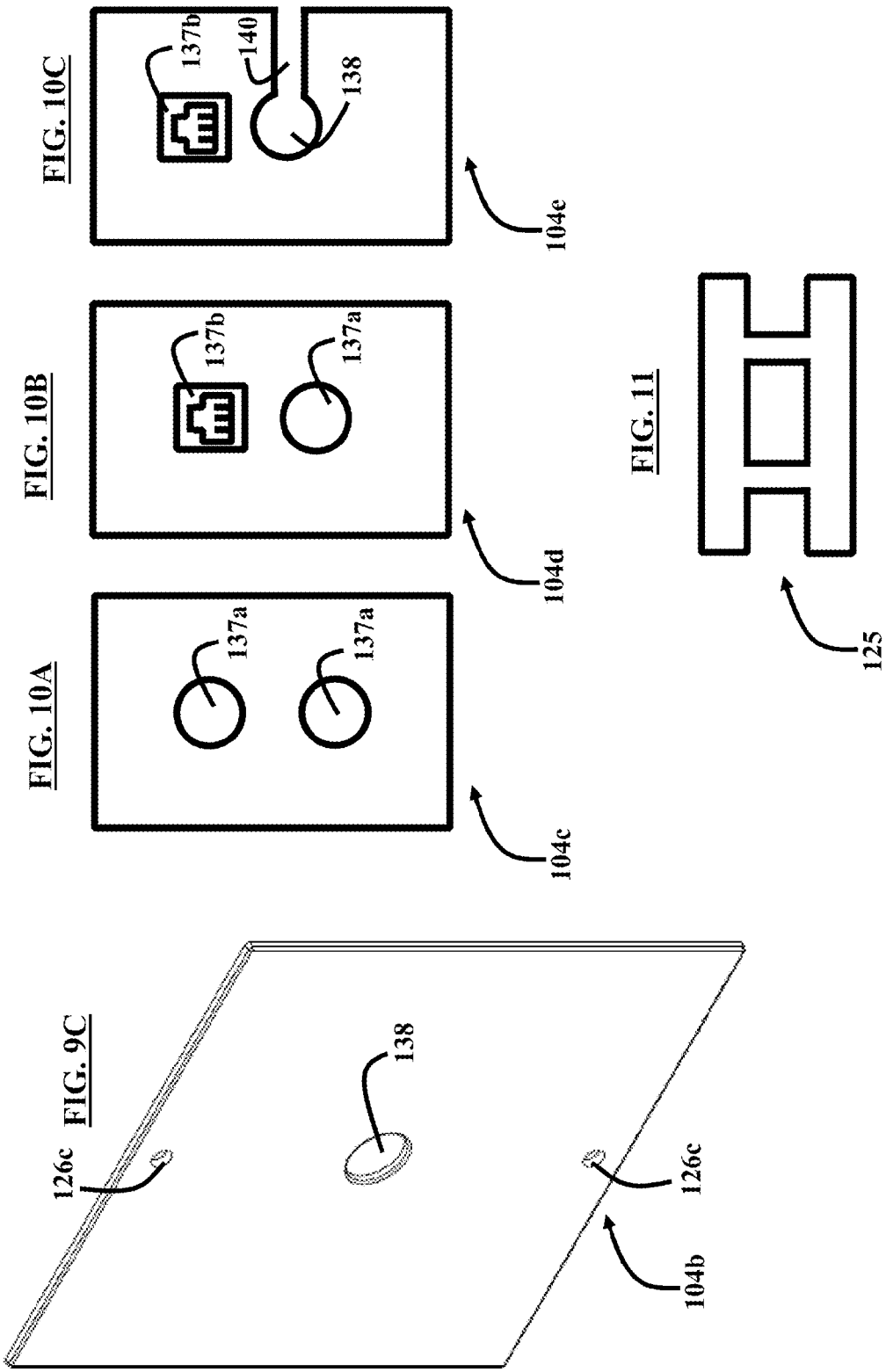

CONCEALED AND FLUSH DUAL PHONE AND POWER OUTLET

CROSS-REFERENCE TO RELATED APPLICATIONS

This application claims the benefit of U.S. Provisional Patent Application No. 61/075,414 filed on Jun. 25, 2008, the contents of which, in its entirety, is herein incorporated by reference.

BACKGROUND

1. Technical Field

The embodiments herein generally relate to telecommunication devices, and, more particularly, to a telephone box that houses telephone wiring.

2. Description of the Related Art

In the past decade, the advent of the cordless telephone has changed the manner in which telephones are connected to the residential, commercial, and industrial infrastructure, needing both power and voice connections. In typical constructions, the wiring for these services is kept separate, though sometimes in close proximity. As a result, a cordless telephone connected in a room and mounted directly on typical phone outlet plates typically requires unattractive connection to power outlets, and generally comprise wires that are usually too long and unattractive wall mounted power supplies.

SUMMARY

In view of the foregoing, an embodiment herein provides a device for securing and enclosing support wiring for electronic equipment comprising a primary frame; a power cover plate; a cover frame; and a cover plate, wherein the power cover plate, the cover frame, and the cover plate attach to the primary frame, and wherein the primary frame simultaneously houses telephone electrical connection components and power electrical connection components. The device further comprises a low voltage connector plate attached to the power cover plate. The low voltage connector plate and the power cover plate may be substantially aligned in a line. The cover frame and the cover plate may be substantially aligned in a line.

The primary frame defines a cavity, wherein the primary frame includes at least one mounting boss to attach the power cover plate. The primary frame may include an enclosed section that is connectively hinged. The device may also include a rotation mechanism attached to the power cover plate. The low voltage connector plate may comprise a feature to allow a power connector and a phone connector to be simultaneously attached thereon. The low voltage connector plate may include a snap feature for mounting to the power cover, and wherein the cover plate is rotatably connected to the primary frame. The cover frame preferably comprises mounting holes to mount to the primary frame and further comprises holes for the phone screws, and wherein the device comprises screws for mounting the cover frame and further comprises phone screws to mount a phone.

The cover frame may comprise hinge features for attachment to the primary frame. The primary frame defines a feature for installation and alignment inside a wall. The primary frame may include top and bottom wire entries with strain relief. The primary frame may include knockouts to allow for the strain relief to be inserted therein. A side opposite the cavity may be open comprising a side tray incorporating a protective wall, wherein the protective wall defines at least two open cavities for placement of a phone plate into a frame.

A system to enclose communication wiring of electronic devices comprises a box; a power cover plate; a cover frame; a cover plate; and a low voltage connector plate attached to the power cover plate, wherein the power cover plate, the cover frame, and the cover plate attach to the box, wherein the low voltage connector plate and the power cover plate are substantially aligned in a line, wherein the cover frame and the cover plate are substantially aligned, and wherein the box simultaneously houses telephone electrical connection components, power electrical connection components, and data electrical connection components. The cover plate may be substantially flush with a wall upon installation. The box may comprise an enclosed section connectively hinged to the box. The system is preferably made of metal, plastic, or combination thereof.

An apparatus for storing communication wiring of electronic devices comprises a primary frame; a power cover plate; a cover frame; and a cover plate, wherein the power cover plate, the cover frame; and the cover plate attach to the primary frame, wherein a low voltage connector plate is attached to the power cover plate, wherein the low voltage connector plate and the power cover plate are substantially aligned in a line, wherein the cover frame and the cover plate are substantially aligned in a line, wherein the primary frame defines a cavity, wherein the primary frame comprises at least one mounting boss to attach the power cover plate, wherein the primary frame comprises an enclosed section that is hinged to the primary frame, wherein a secondary box comprising retaining features defines a power section, wherein the low voltage connector plate comprises a feature to attach a power connector and a phone connector, wherein the low voltage connector plate includes a snap feature for mounting to the power cover, wherein the cover plate is rotatable, wherein the cover frame comprises mounting holes to mount to the primary frame as well as holes for the phone screws, wherein mounting to the primary frame is achieved with angled holes for screws, and wherein the cover frame comprises a hinge for attachment to the primary frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A illustrates a schematic diagram of a concealed and flush dual phone and power outlet box according to an embodiment herein;

FIG. 1B illustrates a schematic diagram of a concealed and flush dual phone and power outlet box according to an alternate embodiment herein;

FIG. 2B illustrates a schematic diagram of an assembly with the cover plate removed and the power supply plugged in according to an alternate embodiment herein;

FIG. 3B illustrates an exploded view schematic diagram of an assembly according to an alternate embodiment herein;

FIG. 4A illustrates a left-side view schematic diagram of a frame according to an embodiment herein;

FIG. 4B illustrates a right-side view schematic diagram of a frame according to an embodiment herein;

FIG. 5 illustrates a schematic diagram of a swing out frame for power or phone according to an embodiment herein;

FIG. 6 illustrates a schematic diagram of a power cover according to an embodiment herein;

FIG. 7 illustrates a schematic diagram of a swing out frame concept for power or phone according to an embodiment herein;

FIG. 8 illustrates a schematic diagram of a cover frame according to an embodiment herein;

FIG. 9A illustrates a front view schematic diagram of a cover according to an embodiment herein;

FIG. 9B illustrates a rear view schematic diagram of a cover according to an embodiment herein;

FIG. 9C illustrates a front view schematic diagram of a cover according to an alternate embodiment herein;

FIGS. 10A through 10C illustrate schematic diagrams of examples of other alternative cover configurations according to the embodiments herein;

FIG. 11 illustrates a schematic diagram of a cable management clip according to an embodiment herein.

DETAILED DESCRIPTION OF PREFERRED EMBODIMENTS

Figure 2A:
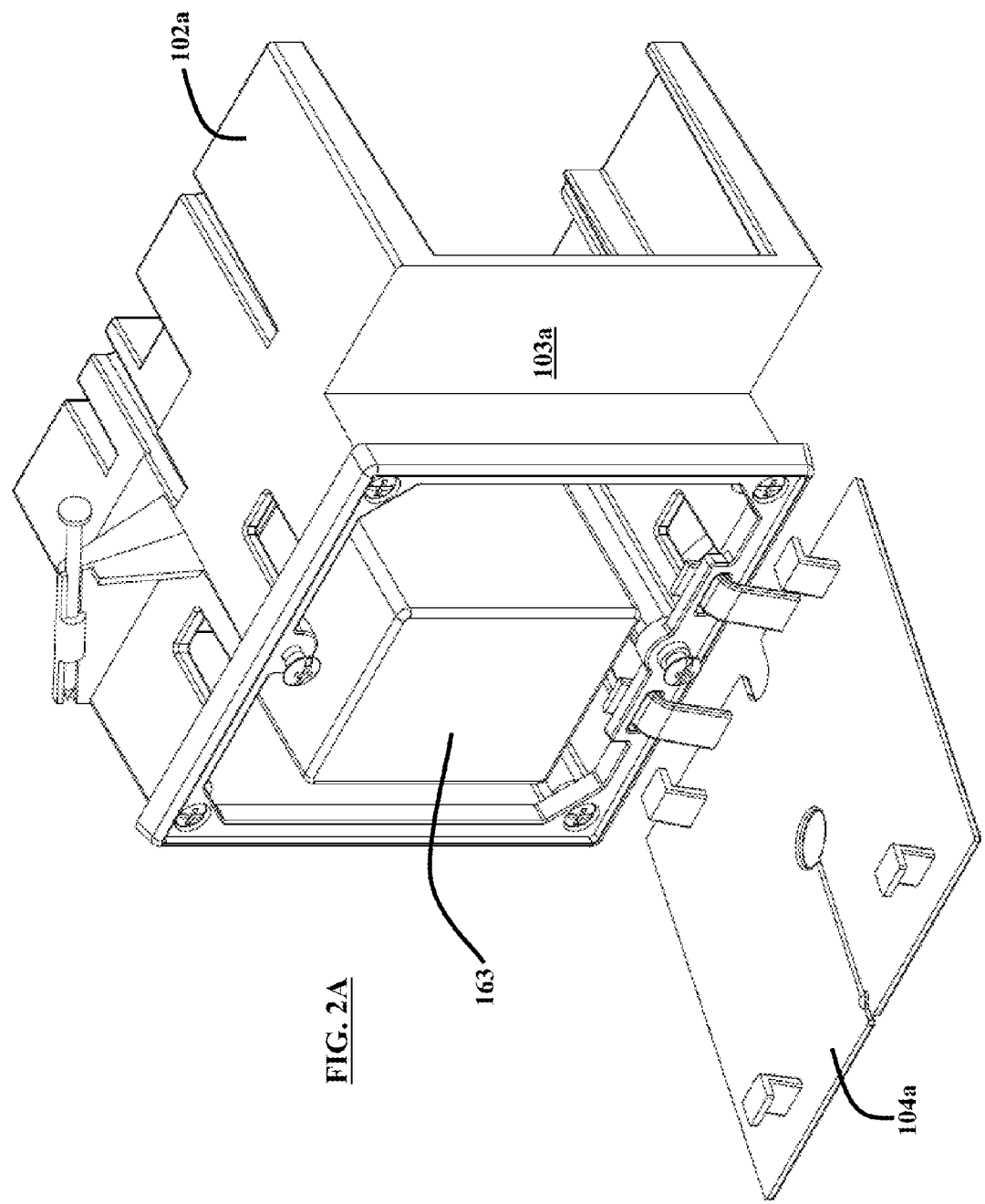
FIG. 2A illustrates a schematic diagram of an assembly with cover plate dropped and power supply plugged in according to an embodiment herein.

The embodiments herein and the various features and advantageous details thereof are explained more fully with reference to the non-limiting embodiments that are illustrated in the accompanying drawings and detailed in the following description. Descriptions of well-known components and are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a telephone wiring and outlet box that provides enhanced telephone wire connection capabilities. The embodiments herein combine voice and power wiring in a single outlet, in which once the power supply (wall mounted AC to DC converter) and communication line are connected, the phone installed on the outlet cover hides all wiring. Accordingly, only the phone is visible in the installation. In the context of the embodiments herein, a communication line includes any network or phone line that permits electronic communication between a corresponding transmission and receiving device.

Referring now to the drawings, and more particularly to FIGS. 1 through 12, where similar reference characters denote corresponding features consistently throughout the figures, there are shown preferred embodiments. Referring to FIGS. 1A-1B and 3A an embodiment of the box 100a is shown with various components as directed to "new" construction, and FIGS. 2A-2B and 3B illustrates an alternate embodiment of the box 100b for use in the existing/old construction. Both embodiments have a cover plate 104a, 104b, cover frame 106, and power cover 108 directed for use with new or existing/"old" construction designs. As referred to herein, "new construction" refers to using the embodiments herein in a new building/house that is being constructed, and "old construction" refers to using the embodiments herein in an older house, wherein the embodiments herein will replace the previously installed phone boxes.

The primary frame 102a of first embodiment herein, and the primary frame 102b of an alternate embodiment herein are each a single outlet box, to be called the "dual-purpose outlet frame(s)", made of plastic, metal or combination thereof. The primary frame 102a, 102b of each box 100a, 100b, respectively, mounts to a beam, stud, metal or wood (not shown), using screws or nails but do not include any protrusion on the top and bottom to be fed wiring through smaller openings. All other screws, nails are common hardware components available in the market and possibly used in outlet boxes.

Figure 3A:
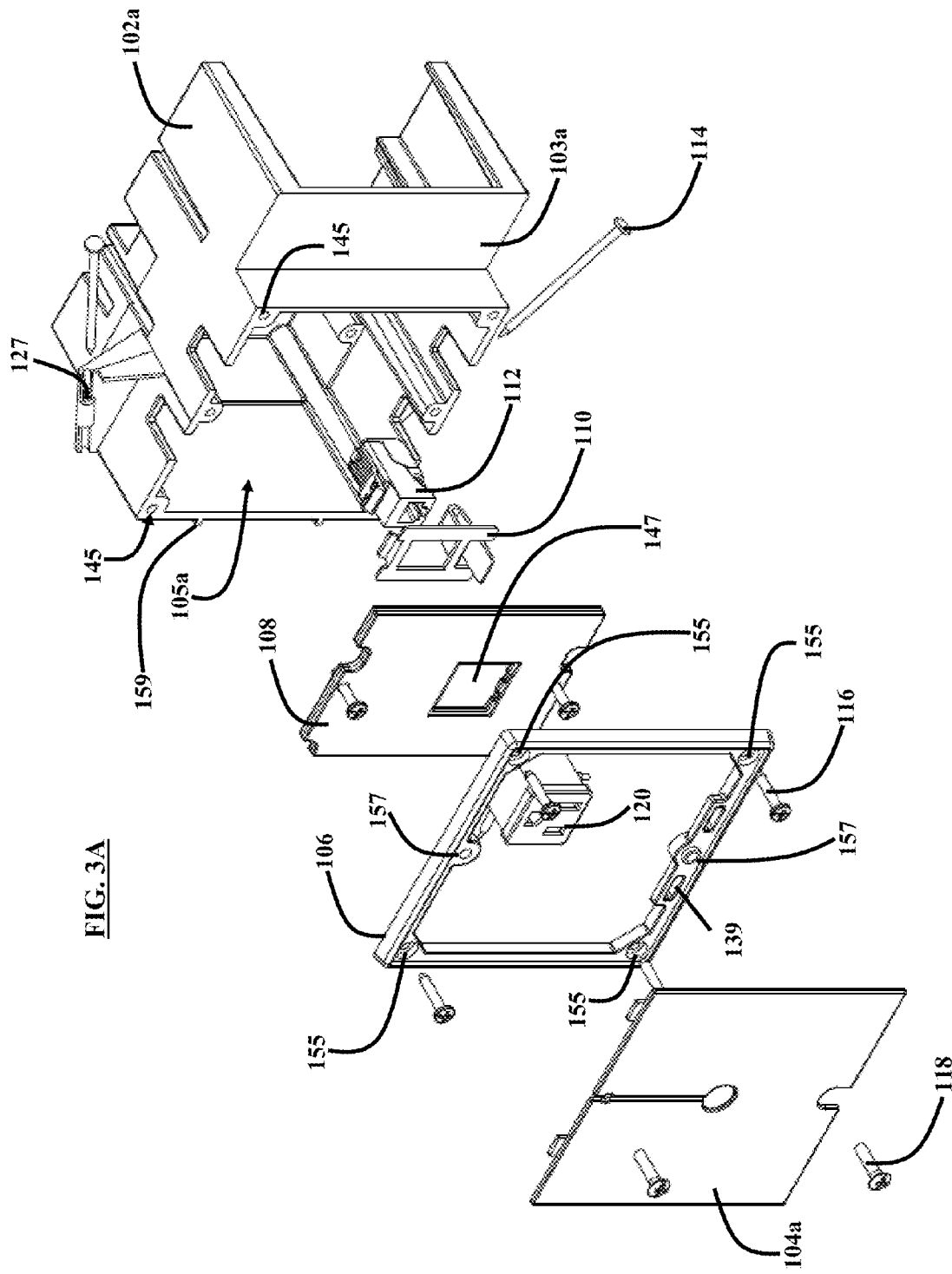
FIG. 3A illustrates an exploded view schematic diagram of an assembly according to an embodiment herein.

Referring to FIGS. 1A, 2A, and 3A, in an embodiment herein, the plastic and/or metal primary frame 102a includes a feature 159 to help with installation and alignment inside the wall (not shown) for depth. The frame 102a further includes an optional covering 103a to protect cabling. Referring to FIGS. 1A, 2A, 3A, 1B, 2B, and 3B, the primary frame 102a, 102b of each box 100a, 100b, respectively, comprises a cavity 105a, 105b, for the power wiring (not shown). The primary frame 102a, 102b of each box 100a, 100b, respectively, includes at least two mounting bosses 145 to attach the power cover plate 104a, 104b which fully enclose the high voltage wiring.

Referring to FIGS. 4A and 4B, the frame of the embodiment 102a also includes top and bottom wire entries 117 with strain relief in the primary frame 102a. In the context of the embodiments herein, strain relief refers to the ability to lock a cable in place so it cannot be pulled out inadvertently and create a hazard. The primary frame 102a can include knockouts (not shown) to allow for a metal strain relief (or connector) to be inserted. The side 119 opposite the power cavity 105a is open to allow for low voltage voice or Ethernet wiring (not shown) to be routed therethrough, and for a DSL filter or surge protector (not shown) that can be dropped into a side tray 109a, incorporating a feature 111a defining two open cavities for a phone plate (not shown) to be snapped or screwed into the primary frame 102a.

As best illustrated in FIGS. 5A-5C, each frame (as generically shown as frame 102 in FIGS. 5A-5C) can be rotated 180° to be attached left side or right side of the stud (not shown), requiring a single box design for left or right mounting. The primary frame 102a, 102b may include an enclosed section 113 that can be swung or hinged out of the way to make extra space for either the phone or power. The enclosed section 113 with retaining features can serve as the power section, a closed cavity with cover, or the phone section, with space for a filter. By allowing this section 113 to be moved out of the way, additional space can be obtained to either include the space inside the primary frame 102a, 102b or decrease the overall size of the primary frame 102a, 102b.

Referring to FIGS. 1A through 3B and 6 the power cover plate 108 can be made of plastic or metal as required by the building code of a particular house/building or safety standards. The cover 108 is configured to be installed in either orientation, to allow the outlet connector 120 to be configured on the top or bottom of the cover frame 106 regardless of the orientation of the box 100a, 100b and side of the stud to which the box 100a, 100b is attached. An opening 147 allows for a commercially available certified plug 163 to be snapped in place in any orientation (4 different angles). The plate 108 includes either mounting holes (as best illustrated in FIGS. 3A and 3B) or snap features (not shown) as allowed by the building code.

Figure 12:
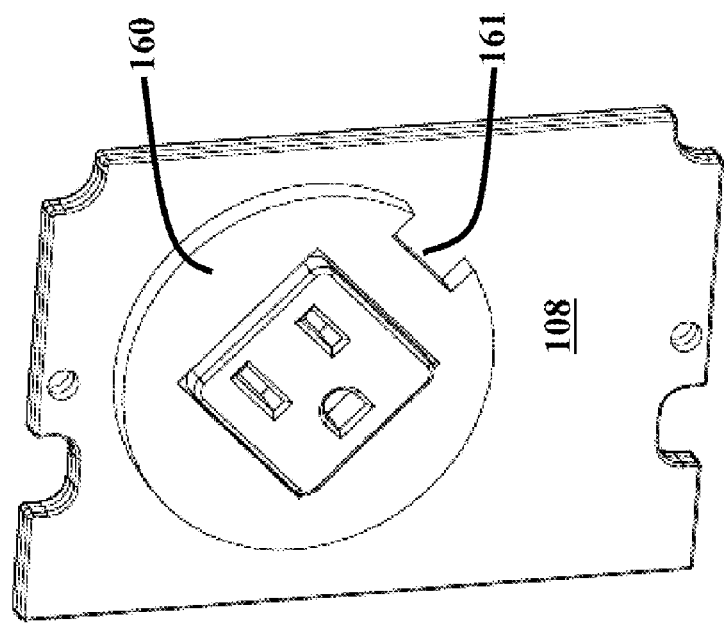
FIG. 12 illustrates a schematic diagram of a rotation device used in accordance with the embodiments herein.

Furthermore, in accordance with the second embodiment of FIG. 3B, the plate 108 can incorporate a feature for the outlet connector 120 to be rotated without removing the plate 108. For example, as shown in FIG. 12, a wheel 160 can be incorporated on the plate 108 that will rotate 90° (or any appropriate rotation) to allow the outlet connector 120 to be spun as necessary by a plug (not shown). A finger slot 161 attached to the wheel 160 allows a user to spin the wheel 160. Alternatively, the outlet connector 120 can be snapped into the plate power cover plate 108 with snap features that allow the outlet connector 120 to be rotated without the power cover plate 108 requiring removal. Removal of the power cover plate 108 will also allow the outlet connector 120 to be rotated.

Referring to FIGS. 1A through 3B and FIG. 7, the low voltage connector plate 110 comprises an aperture 150 to allow a voice connector (RJ-11) or data connector (RJ45) 112 to be snapped therein. The outlet connector 120 and the phone connector (RJ11)/Ethernet connector (RJ45) 112 are commercially available components which are used with the embodiments herein. The connectors 112 can be connected to the structure wiring (not shown) in various ways. For ease of assembly, connectors 112 requiring no special tools may be used.

The low voltage connector plate 110 is made of plastic or metal and includes a snap feature 128 or holes (not shown) for screw mounting to the connector 112. The low voltage connector plate 110 is designed to fit top or bottom in the primary frame 102a, 102b and can be spun as necessary (as discussed previously with regards to the power cover plate 108). It is appreciated that additional low voltage connector plates 110 can be stacked inside one primary frame 102a, 102b (in the case of dual voice and Ethernet connections).

The cover frame 106 provides a structural support for the phone (not shown) when it is installed in an opening to allow for the power and voice to be connected or disconnected. The cover frame 106 is made of plastic or metal. The cover frame 106 comprises mounting holes 155 that align with the mounting bosses 145 of the primary frame 102a, 102b to allow screws 116 to mount the cover frame 106 to the primary frame 102a, 102b. The cover frame 106 further comprises holes 157 to receive the phone screws 118. Phone screws 118 for the phone support are configured to fit in common phone bracket slots. The screws 118 may incorporate slot, Philips drive, hex, or other drive designs. The cover frame 106 can also include hinge or alignment features (not shown) for attachment to the primary frame 102a, 102b.

Referring to FIG. 3A, mounting of the primary frame 102a to a wall or stud (not shown) is achieved with angled holes 127 for screws 114 or swinging tabs (not shown) commonly used in outlet boxes designed for old construction.

Referring to FIGS. 8, 9A-9C and 10A-10C, the cover plate 104a-e acts primarily as an enclosure over the open box 100a, 100b. The cover plate 104a-e can be made of plastic or metal and can incorporate tabs 143 internally to route excess power and, or communication wiring. Additionally, as best illustrated in FIG. 11, an H-clip 125 can be used to route the wiring internally as a separate item used only if necessary. Furthermore, the cover plate 104a-e comprises hinges 141 that aid in pivotally mounting the cover plate 104a-e to the holes 139 of the cover frame 106. The hinges 141 allow the cover plate 104a-e to be swung open and the wiring organized easily. A hole 138, which may have an adjacent slot 140, as best illustrated in FIGS. 1A, 2A, 3A, 9A, and 9B is meant to feed the low voltage and communication cables to a cordless phone (not shown). The cover plate 104c-e may also have a plurality of openings 137a-b for each of the cables as illustrated in FIGS. 10A-10C. For example, one of the openings 137b could be designed to accept a snap in RJ11/RJ45 plug (not shown) that will allow the voice cable to be connected without removing the cover plate 104a-e. The cover plate 104a-e may be screwed directly onto the cover frame (as illustrated in FIGS. 1A, 1B, 3A and 3B by inserting screws 118 through holes 126a-c. Finally, a plug (not shown) may be used to cover the open holes 137a-b, 138 and slot 140 when a phone is not installed in place. For alternate options, the cover plate 104a-e can be configured to fit a speaker, security alarm electronics or sensors, a smoke detector sensor, a doorbell or a wireless gateway antenna.

In new installation the primary frame 102a is installed like most outlet boxes, e.g. nailed or screwed into the stud. AC wiring is dropped to the box 100a and inserted top or bottom or both via the wire entries 117. The low voltage connector 112 is snapped into the power cover 108. Wires are connected using typical and applicable twist-on wire connectors. The power cover 108 is screwed into the primary frame 102a and screwed or snapped into place. The low voltage/phone/Ethernet wire is brought in from the side. The wires are connected as specified by the connector vendor. The connector 120 is snapped into the low voltage plate 110 which is screwed or snapped into the primary frame 102a. If desired, a second low voltage plate may be installed (as discussed herein). The cover frame 104 is screwed, snapped or hinged to the primary frame 102a. The power plug (not shown) for the phone is plugged in to the outlet connector 120 and its wires routed appropriately. The communication line cable is plugged into the low voltage connector 112 and its excess wire can also be routed. A small length of wire of each cable is placed through the hole(s) 138 (and discussed herein) of the cover plate 104a, 104b in preparation for the phone. If applicable, a DSL filter or surge protector is connected in series with the communication line and dropped into the open side tray 109a or through the feature 111a. The phone screws 118 are installed and the communication cabling (not shown) is connected and the phone (not shown) inserted over the phone screws 118.

The installation is the same in "older construction" except the opening preparation may need to be different. Installation for alternative use is similar except the functional items are also inserted or connected inside the box 100a, 100b before placing the cover plate 104a, 104b back on. The embodiments herein accommodate a large number of typical functions required in a residential, industrial, or commercial application.

The embodiments herein organize the telephone-to-wall connection while providing a cost effective alternative to the typical two-outlet alternative. The embodiments herein also free outlets in older constructions with usually too few outlets available. The embodiments herein also allow for electronics to be inserted inside the unit, when the building/design/electrical code allows for it, to conceal items that otherwise take space and often look unattractive. Speakers, security alarms electronics or sensors (motion detectors, sound detectors), smoke detectors, doorbell enclosures, security, wireless gateways can also be fitted inside the wall with a specific faceplate design.

The embodiments herein can be used in a variety of applications, from residential to commercial and industrial application, in labs, kitchens, bathrooms, offices and any other dwelling application. The embodiments herein can be used in both new constructions as well as refurbished dwellings. The main box can be made of plastic or metal as required by the building codes, and can incorporate various mounting methods to allow installation in a building upgrade.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A device for securing and enclosing support wiring for electronic equipment comprising:
    a primary frame;
    a power cover plate;
    a low voltage connector plate attached to said power cover plate;
    a cover frame; and
    a cover plate,
    wherein said power cover plate, said cover frame, and said cover plate attach to said primary frame, and
    wherein said primary frame simultaneously houses telephone electrical connection components and power electrical connection components.

2. The device of claim 1, further comprising a stack of low voltage connector plates attached to said power cover plate.

3. The device of claim 1, wherein said low voltage connector plate and said power cover plate are substantially aligned in a line.

4. The device of claim 3, wherein said cover frame and said cover plate are substantially aligned in a line.

5. The device of claim 4, wherein said primary frame defines a cavity, wherein said primary frame includes at least one mounting boss to attach said power cover plate.

6. The device of claim 5, wherein said primary frame includes an enclosed section that is connectively hinged.

7. The device of claim 1, further comprising a rotation mechanism attached to said power cover plate.

8. The device of claim 5, wherein said low voltage connector plate comprises a feature to allow a power connector and a phone connector to be simultaneously attached thereon.

9. The device of claim 8, wherein said low voltage connector plate includes a snap feature for mounting to said power cover, and wherein said cover plate is rotatably connected to said primary frame.

10. The device of claim 9, wherein said cover frame comprises mounting holes to mount to said primary frame and further comprises holes for said phone screws, and wherein said device comprises screws for mounting said cover frame and further comprises phone screws to mount a phone.

11. The device of claim 10, wherein said cover frame comprises hinge features for attachment to said primary frame.

12. The device of claim 11, wherein said primary frame defines a feature for installation and alignment inside a wall.

13. The device of claim 12, wherein said primary frame includes top and bottom wire entries with strain relief.

14. The device of claim 13, wherein said primary frame includes knockouts to allow for said strain relief to be inserted therein.

15. The device of claim 14, wherein a side opposite the cavity is open comprising a side tray incorporating a protective wall, wherein said protective wall defines at least two open cavities for placement of a phone plate into a frame.

16. A system to enclose communication wiring of electronic devices, said system comprising:
    a box;
    a power cover plate;
    a cover frame;
    a cover plate; and
    a low voltage connector plate attached to said power cover plate,
    wherein said power cover plate, said cover frame, and said cover plate attach to said box,
    wherein said low voltage connector plate and said power cover plate are substantially aligned in a line,
    wherein said cover frame and said cover plate are substantially aligned, and
    wherein said box simultaneously houses telephone electrical connection components, power electrical connection components, and data electrical connection components.

17. The system of claim 16, wherein said cover plate is substantially flush with a wall upon installation.

18. The system of claim 17, wherein said box comprises an enclosed section connectively hinged to said box.

19. The system of claim 17, wherein the system is made of metal, plastic, or combination thereof.

20. An apparatus for storing communication wiring of electronic devices, said apparatus comprising:
    a primary frame;
    a power cover plate;
    a cover frame; and
    a cover plate,
    wherein said power cover plate, said cover frame; and said cover plate attach to said primary frame, wherein a low voltage connector plate is attached to said power cover plate, wherein said low voltage connector plate and said power cover plate are substantially aligned in a line, wherein said cover frame and said cover plate are substantially aligned in a line, wherein said primary frame defines a cavity, wherein said primary frame comprises at least one mounting boss to attach said power cover plate, wherein said primary frame comprises an enclosed section that is hinged to said primary frame, wherein a secondary box comprising retaining features defines a power section, wherein said low voltage connector plate comprises a feature to attach a power connector and a phone connector, wherein said low voltage connector plate includes a snap feature for mounting to said power cover, wherein said cover plate is rotatable, wherein said cover frame comprises mounting holes to mount to said primary frame as well as holes for said phone screws, wherein mounting to said primary frame is achieved with angled holes for screws, and wherein said cover frame comprises a hinge for attachment to said primary frame.

* * * * *